June 4, 1935.　　　　　E. D. DOYLE　　　　　2,003,681
MEASURING APPARATUS
Filed Jan. 28, 1930　　　4 Sheets-Sheet 1

Inventor
Edgar D. Doyle
By
Attorney

June 4, 1935.  E. D. DOYLE  2,003,681
MEASURING APPARATUS
Filed Jan. 28, 1930    4 Sheets-Sheet 2
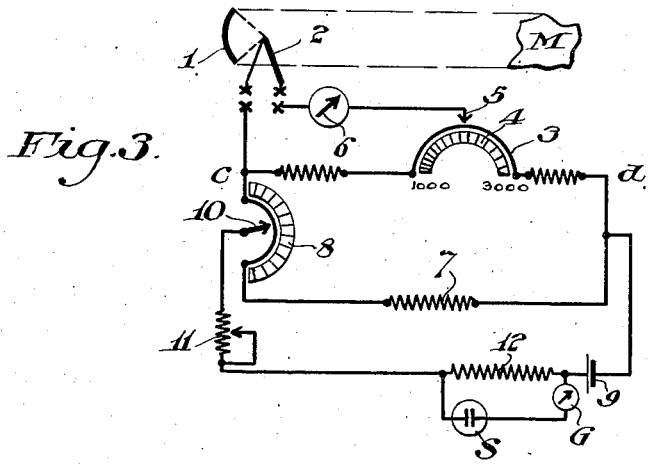
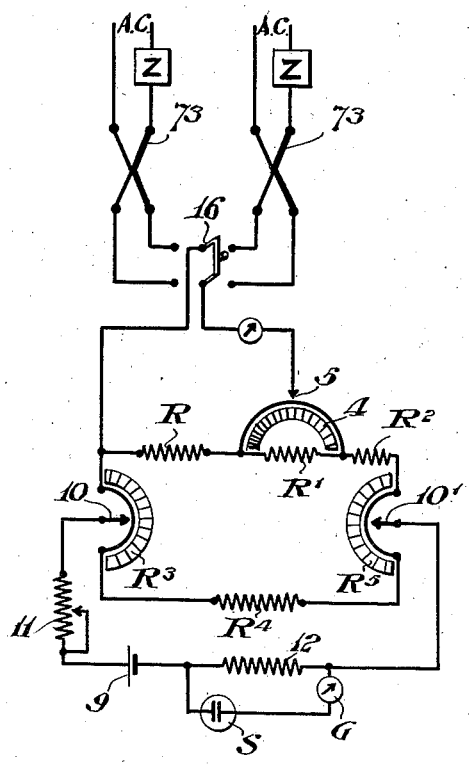
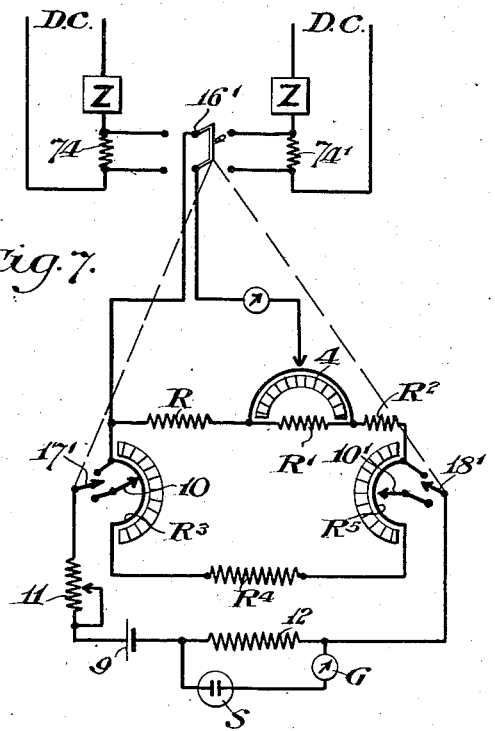
Inventor
Edgar D. Doyle
By Cornelius D. Ehret
Attorney

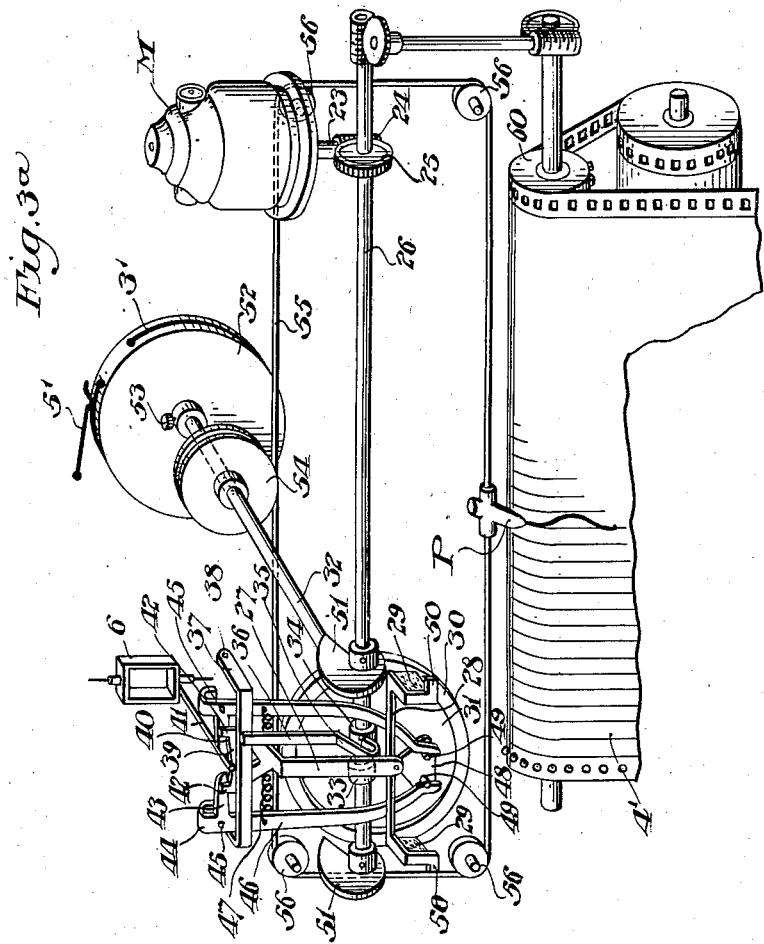

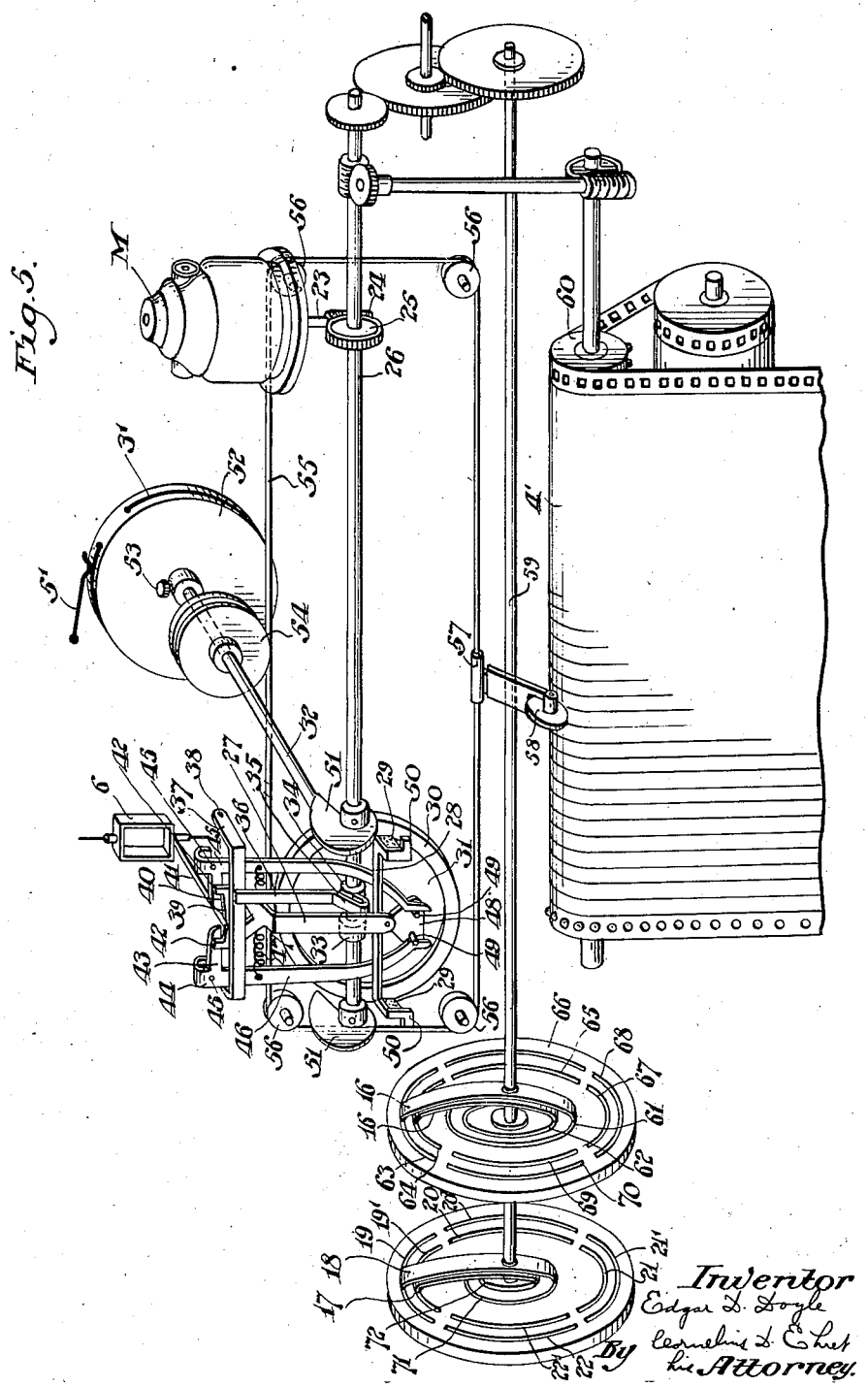

Patented June 4, 1935

2,003,681

UNITED STATES PATENT OFFICE 2,003,681

MEASURING APPARATUS

Edgar D. Doyle, Philadelphia, Pa., assignor to Leeds and Northrup Company, Philadelphia, Pa., a corporation of Pennsylvania Application January 28, 1930, Serial No. 423,923

17 Claims. (Cl. 73—32)

My invention relates to apparatus for measuring conditions or variations in conditions, as chemical, electrical, physical, and other conditions, and more particularly to radiation pyrometry wherein radiant heat from material at high temperature impinges upon a thermoelectric device, as a thermo-couple, producing an electrical effect of magnitude determined by the temperature of the material and the response characteristic of the device.

It is well recognized that it is practically impossible to manufacture or obtain radiation pyrometers having precisely the same temperature-voltage characteristics, and that because of the difference in their response curves, it is not possible to interchange radiation pyrometers in a calibrated electrical network, as a potentiometer circuit, utilized to indicate, record or control temperature. To greater or less extent, the same difficulty is experienced with all response elements utilized to measure the magnitudes of various conditions. However, it is not at all difficult to produce or procure response elements for a certain purpose whose calibration curves follow the same law of variation. Specifically, the temperature-voltage curves of radiation pyrometers when plotted on log-log paper are substantially parallel throughout. Otherwise expressed, the ratio of the potentials developed by two pyrometers at a particular temperature is the same as that for any other temperature within the working range.

It is the purpose of my invention to permit response elements, specifically radiation pyrometers, of different characteristics to be used interchangeably with an electrical network of the above character with the assurance that the measurements, as of temperature, shall be correct throughout a working range. In accordance with my invention, upon the substitution of one response element for another, the calibration of the network is changed proportionally to the ratio of the magnitudes of the responses of the devices for the same magnitude of the condition; more specifically, thermo-couples are successively included in circuit with the network and the calibration of the network is substantially simultaneously varied proportionally to the potentials produced by the thermo-couples when exposed to the same temperature.

Further in accordance with my invention, the potentiometer is of the split type and the ratio between the currents in the branches is determined by one or more adjustable resistances, having associated scales or dials so calibrated that upon adjustment of resistance-varying elements to settings corresponding to a constant of the response device in circuit, the measurements obtained or control effected will be correct.

My invention further resides in the system and apparatus hereinafter described and claimed.

For an understanding of my invention and for an illustration of some of its many uses, reference is to be had to the accompanying drawings in which:

Fig. 3 is a diagrammatic view of pyrometric apparatus embodying my invention.

Fig. 3a shows automatic apparatus for balancing and recording purposes.

Figure 4:
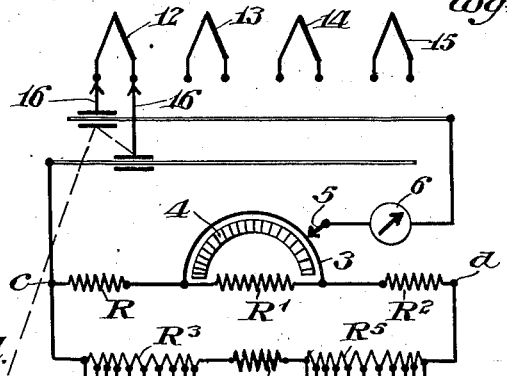

Fig. 4 diagrammatically illustrates a pyrometric system in which a plurality of radiation pyrometers are successively connected to an electrical measuring network.

Fig. 5 shows in perspective automatic apparatus capable of being used in the system of Fig. 4.

Figs. 6 and 7 are diagrammatic views of current measuring systems embodying my invention.

Figure 1:
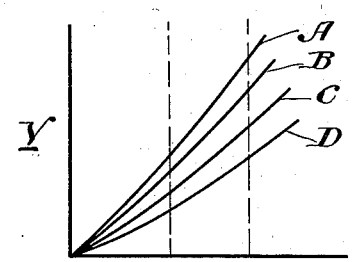
Fig. 1 is a graphic representation of the temperature voltage characteristics of different radiation pyrometers.

Referring to Fig. 1, the curves A, B, C and D are the voltage-temperature response curves of a plurality of radiation pyrometers. As the curves do not coincide and are non-linear, it is impossible to make a true or accurate correction simply by changing the reading of a measuring instrument associated therewith by fixed amounts corresponding to differences between the magnitudes of the responses at a particular temperature, for example, at any temperature within the working range between the points $a$, $b$.

Figure 2:
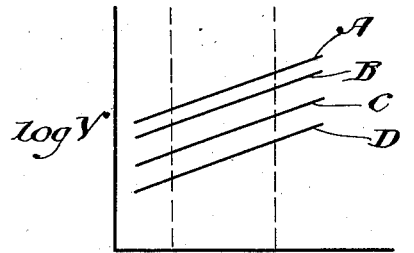
Fig. 2 is a graphic representation of the log-voltage-temperature characteristics of the same group of radiation pyrometers.

The curves A, B, C and D, however, follow the same law of variation. The voltage produced by each of the thermo-couples varies substantially as the fourth power of the absolute temperature to which it is subjected. The curves when plotted on log-log paper, Fig. 2, are substantially equi-distant throughout and are practically parallel within the working range between temperatures $a$, $b$. The ratio of the potentials developed by the pyrometers at temperature $a$, for example, is the same as the ratio of the potentials for any other temperature within the working range.

Referring to Fig. 3 heat radiated from a mass M at elevated temperature is focused by a mirror 1 upon the junction of a thermo-couple 2 producing a rise in temperature of the thermo-couple junction producing an electro-motive force whose magnitude is a function of the temperature of the mass M. The particular potential-measuring network shown in Fig. 3 is a potentiometer having a slide wire 3 provided with a scale 4 calibrated in units of temperature. To determine the temperature of the mass M, the contact 5 is moved along the slide wire 3 until there is no deflection of the indicating member or needle of the galvanometer 6 or equivalent. The slide wire contact 5 at the condition of balance cooperates with the scale 4 directly to indicate temperature. It has not been possible heretofore to substitute one thermo-couple for another without recalibrating the slide wire scale, because of the impossibility of procuring pyrometers having the same calibration curves.

It is desirable from the viewpoint of the manufacturer of pyrometer apparatus that he may be able to supply in replacement of, or substitution for, the pyrometer unit or response element originally a part of the equipment sold, other pyrometers which are interchangeable in the sense that they may be employed with the assurance that the temperature measurements made therewith shall be correct.

Interchangeability of the pyrometer units is equally desirable from the viewpoint of the user who may then, without recalibration of his instrument or without return of the instrument to the maker of the new or substitute pyrometer unit for a calibration with respect to the new unit, procure new or substitute pyrometer units with assurance that they will properly cooperate or be properly related to his apparatus to effect accurate temperature measurements. The interchangeability of the radiation pyrometers also permits the use of a single measuring apparatus with a large number of thermo-couple units as is hereinafter described. To attain these ends with a potentiometer system I preferably provide a current path in shunt to the slide wire, the ratio between the impedances specifically resistances, of the parallel paths being adjustable.

The slide wire circuit which may, for purposes of explanation, be considered as extending between the points $c$ and $d$, is shunted by resistances 7 and 8 in series, Fig. 3. The terminals of a current supply circuit for the potentiometer including the current source 9 are connected to the point $d$ and to a contact 10 adjustable along the resistance 8.

At the factory or laboratory the voltages produced by the thermo-couples at a particular temperature are noted. This information is conveyed to the ultimate user of the thermo-couples in any suitable manner, as for example by marking each thermo-couple with its response at the calibrating temperature as a constant.

In use, as one thermo-couple is substituted for another, the setting of the contact 10 is changed to vary the calibration of the potentiometer network proportionally to the ratio between the markings on the thermo-couples removed from and inserted into circuit. Change in position of the contact 10 effects but negligibly the change in resistance of the whole circuit with respect to the source of current 9 and it is therefore not necessary to change the value of the adjustable resistance 11 with each change in position of contact 10 to maintain the potentiometer current through the high, standard-cell resistance 12 substantially constant. However, as is usual, from time to time and because of the change in potential of the current source 9 from deterioration, for example, it is desirable to change the setting of resistance 11 so that the drop of potential due to the potentiometer current across resistance 12 is equal and opposite that produced by the standard cell S, the galvanometer G indicating when balance is obtained.

Balancing of the network and recording of temperature may be effected by apparatus generally similar to that disclosed in Leeds Patent 1,125,699. Referring to Fig. 3a, the source of power M, as an electric motor, continuously rotates the shaft 23 upon which is secured the worm 24 which drives the gear 25 secured upon the shaft 26. Upon the arm 27 mounted upon pivots, not shown, is pivoted the arm 28, on each end of which is carried a shoe 29, of cork or equivalent material, frictionally engaging the rim 30 of the clutch disc 31 secured upon the shaft 32. A cam 33, secured upon the shaft 26, periodically moves lever 27 outwardly away from the disc 31 against a spring, not shown, thereby lifting the shoes 29 free from the rim 30, and after predetermined rotation of cam 33 the lever 27 is returned to normal position, bringing the shoes 29 again into engagement with the rim 30. A second cam 34 secured upon the shaft 26 actuates the end of finger 35, upon the lower end of the arm 36, when the shoes 29 are free of the rim 30. The arm 36 is secured at its upper end to the member 37, pivoted at 38. Secured upon the member 37 is the member 39 whose upper edge 40 is inclined upwardly and outwardly from the center. Disposed immediately above the edge 40 and normally swinging free thereof is the needle or pointer 41 of the galvanometer 6. The abutments 42 on member 31 limit the deflection of the needle 41. Above the needle and beneath which it normally freely swings are the preferably straight and horizontal edges 43 of the members 44 pivoted at 45. The members 43 extend toward each other and are spaced by a gap at their inner ends of sufficient width to allow free entry of the needle when in balanced or zero position. The members 44 have downwardly extending arms 46 biased toward each other by a spring 47. Attached to the lower end of arm 27 is the plate 48 carrying the pins 49 cooperating with the lower ends of the members 46. On opposite ends of arm 28 are the lugs 50 adapted to be engaged, when the arm 28 has been deflected from its normal position by either of the members 46, by the cams 51 secured upon the shaft 26.

As described in the aforesaid Letters Patent when the galvanometer needle 41 deflects in one direction or the other from its mid or zero position indicated in Fig. 3a, it is periodically clamped between the lower edge 43 of one of the members 44, under which it has deflected, and an edge 40 of member 39, thereby deflecting the member 28, when arm 27 has been moved outwardly by cam 33, to an extent corresponding with the extent of deflection of needle 41. Immediately thereafter the shoes 29 come into engagement with the rim 30 of disc 31, and thereafter one of the cams 51 engages one of the lugs 50, restoring lever 28 to its normal position indicated, and thereby carrying around with it the disc 31 and the attached shaft 32 and parts connected thereto. Similarly deflection of needle 41 in opposite direction effects movement of shaft 32 in oposite direction and to an extent corresponding to the extent of deflection of the needle.

Secured upon the shaft 32 is a disc 52 of insulating material carrying upon its periphery the slide wire resistance 3' with which co-acts the stationary brush or contact 5'. The disc 52 may be secured in any suitable angular position with respect to shaft 32 by set screw 53.

Upon the shaft 32 is attached a pulley 54 around which is wrapped the cord 55, passing over idler pulleys 56 and secured to the recorder pen P. A record sheet 4' is continuously advanced by roller 60 driven from motor M through shaft 26. If it is desired to control the recorded temperature, a control disc carrying electric contacts, for example, may be affixed to shaft 32 as disclosed in Brewer Patent 1,361,676 and Schofield Patent 1,683,809.

Referring to Fig. 4, the thermo-couples 12, 13, 14 and 15 whose response curves may correspond to those of Fig. 1, for example, are adapted to be selectively and successively included in circuit with the potentiometer network by moving the contact arms 16 into engagement with the terminals of the pyrometers or with pairs of switch contacts respectively associated therewith. The values of the resistances R, R1 and R2 are so chosen that the potential between C and the junction of R1 and R2 is equal to the maximum voltage developed by any one of the pyrometers at the maximum temperature of the working range; and the potential between C and the junction of R and R1 is equal to the voltage of the same pyrometer at the lowest temperature of the range.

The magnitude of resistance R1 will hereafter for purposes of explanation be considered as the composite resistance of the slide wire 3 and resistance R1. It is assumed that for any given temperature, the voltage developed by the highest reading pyrometer will not be greater than twice the voltage developed by the lowest reading pyrometer which is a conservative assumption based upon extensive experience. The total resistance of R3 which may, for example, be divided into nine sections of equal value each equal to one-tenth of the sum of the resistances R, R1 and R2. Resistance R4 is equal to the sum of the resistances R, R1 and R2. Resistsance R5 may, for example, be divided into ten sections the total of which is equal to the resistance of each section of R3. Dial switches 10a and 10b associated respectively with resistances R3 and R5 enable the circuit to be adjusted so that any desired ratio of currents in the slide wire arm c, d and resistance R4 may be produced. For example, if the potential drop across the opposite terminals of resistances R and R1 is 20 milli-volts with switch arms at points 19 and 1 of the switches 10a and 10b respectively, it would be 10 millivolts with the switch arms in their other extreme position. Any other intermediate value may be obtained by suitably setting the adjustable contact arms of the dial switches.

It will be assumed that at 2500 degrees F., the potentials produced by the thermo-couples 12, 13, 14 and 15 were respectively 14.0, 12.4, 17.8 and 16.5 milli-volts respectively. When the thermocouple 12 is included in circuit, the contact arms are set in the position indicated, the contact of dial switch 10a engaging tap 14 and the movable contact arm of the switch 10b engaging contact 0 of resistance R5. The temperature to which the thermo-couple 12 responds can be directly read from the scale 4 when the movable contact 5 is in position resulting in zero deflection of the galvanometer 6. When the thermo-couple 13 is included in circuit and thermo-couple 12 removed therefrom, the setting of the contact arms is changed, the left contact arm of dial switch 10a being moved into engagement with contact 12 and the contact of dial switch 10b being moved into engagement with contact .4 of resistance R5. Temperatures to which the thermo-couple 13 responds may then be directly read from scale 4 for any other temperature within the range of the scale without any further change in the instrument. Or preferably, and as indicated there is provided a second pair of dial switches 10c and 10d whose contact arms are placed in the proper positions, i. e. on contacts 12 and .4 leaving the setting of the first pair of dial switches undisturbed.

The switches 17 and 18, preferably movable simultaneously with each other, and with the switch contact 16, successively engage the pairs of contacts 19, 19', 20, 20', 21, 21' and 22, 22' to connect selectively and successively the pairs of movable contacts of the dial switches to the current supply source of the potentiometer. As the switching mechanism is manipulated to include the thermo-couples in circuit, the switches 17 and 18 simultaneously vary the calibration of the potentiometer according to predetermined settings by including in circuit the respective pair of dial switches. The mechanical connections between the several switch structures are generically represented by dash lines. It is to be understood that by selectively and successively connecting the thermocouples in circuit with the potentiometer network is not meant their connection in any predetermined sequence but only the successive connection of any of a plurality of thermocouples for measurements following one another in close succession.

The distribution of current between the upper and lower branches of the net-work is therefore in each instance varied so that the currents in the upper branch vary proportionally with the potentials developed by the thermo-couples at a particular temperature within the operating range. Therefore the standard potential against which the thermally produced potential is balanced, is varied accordingly.

The selection of the thermo-couples and of the corresponding dial switches may be effected automatically and a record of the temperatures of the several sources of heat associated with the thermo-couples by mechanism in general similar to that of the aforesaid Leeds patent and whose operation has been described in the explanation of Fig. 3.

Referring to Fig. 5, cord 55, passing over idler pulleys 56 instead of being connected to a pen as in the single point instrument, Fig. 3a, is secured to the carriage 57, in which is pivoted the recorder type wheel 58, bearing a number of circumferentially spaced type characters corresponding to the number of thermo-couples to be connected in circuit, and rotated by the shaft 59 driven through suitable gearing from the shaft 26. The record sheet 4' is continuously advanced by the roller 60, continuously driven by shaft 26, and the type wheel 58 is periodically depressed against the record sheet 4', by mechanism shown in the aforesaid Leeds patent and forming no part of the present invention.

To bring the thermo-couples in succession into circuit with the galvanometer 6 and its circuit, the switch arms 16, 16 mounted upon shaft 59 for rotation therewith are insulated from each other and from the shaft. The inner ends of the contact arms 16, 16 individually engage the circumferentially continuous stationary contacts 61, 62 which may be connected respectively to one terminal of the galvanometer 6 and to the point c of the network, Fig. 4. The terminals of the thermo-couple 12 connect respectively with the arcuate switch segments 63, 64 with which engage the outer ends of the contacts 16. Similarly the terminals of thermo-couples 13, 14 and 15 connect with corresponding remaining pairs of arcuate contacts 65, 66; 67, 68; and 69, 70.

The contact arms 17, 18 for varying the calibration of the network are also mounted upon shaft 59 and suitably insulated from each other and the shaft. The inner ends of the contact arms engage circumferentially continuous contacts 71, 72 connected to terminals of the current source.

When the contact arms 16 are in position to include thermo-couple 12, for example, in circuit, the contacts 17, 18 are at the same time in engagement with contacts 19, 19' to include the corresponding dial switches 10a, 10b in circuit. Likewise as each of the remaining thermo-couples is included in circuit by contact 16, the contacts 17, 18 are moved into engagement to effect completion of the circuit through the corresponding dial switches, to vary as heretofore explained, calibration of the potentiometer circuit according to the dial settings of the switches which have been previously made in accordance with the pyrometer constants. Accordingly the records traced upon the sheet 4' representative of the temperatures to which the respective thermo-couples have been subjected are individually correct and visibly indicate true relation between the varying temperatures.

Referring to Fig. 6 there is disclosed an arrangement for measuring the magnitude of alternating current flowing through translating devices Z which utilizes thermo-couples 73, 73. Flow of alternating current through the upper portion of the thermo-couples produces a heating effect productive of a direct current difference of potential across the lower terminals of the thermo-couple. It is practically impossible to produce or procure thermo-couples having the same response characteristic. However, they all follow the same law of variation, the produced E. M. F. varying substantially as the square of the alternating current. The ratio of the produced voltages of the thermo-couples for the same value of alternating current, is the same as the ratio of the voltages for any other alternating current value. To obtain direct readings of current from the scale 4 of the potentiometer, the calibration of the potentiometer circuit is varied by shifting the position of the contacts 10, 10' to effect variation in the distribution of current between the upper and lower branches of the split potentiometer circuit, so that the currents in the upper branch are proportional to the produced potentials at some particular value of impressed alternating current. The chief difference between the apparatus of Fig. 6 and that of Fig. 4 is that the graduations of the scale of the latter will follow a square law rather than a fourth power law. In both Figs. 4 and 6, resistance R5 is provided for fine adjustment. The network may be self-balancing by use of the apparatus of Fig. 3a or may be balanced by manual adjustment of contact 5. In both modifications, resistances R3 and/or R5 may be continuously variable by a slide wire instead of by steps by dial switches. For convenience, there should be provided numerical scales to assist in convenient proportionate change of the standard potential against which the potentials developed by the responsive devices are balanced.

In Fig. 7 there is disclosed an arrangement for measuring direct current by effecting flow thereof through resistances 74, 74' and measuring the drop of potential across the resistances. For different values of resistance, the produced potentials obviously vary for the same value of current. To permit direct reading of current from the scale 4 of the instrument irrespective of the resistance of the shunt, the circuit of the preceding figures may be utilized. The scale 4 will be linear as the potential drop across a resistance varies as the first power of the current traversing it.

To avoid the necessity of resetting the sliders 10 and 10' each time the transfer switch 16' is thrown to opposite position, the switches 17', 18' are mechanically connected to switch 16' for movement simultaneously therewith alternately include in circuit the selected portions of resistances R3, R5. For example, when switch 16' is moved to the right to measure the potential drop across resistance 74', switch 17' is moved to its upper position connecting directly with the left hand end of resistance R while switch 18' is moved to its lower position connecting with contact slider 10' to include in the upper branch of the network the proper, selected portion of resistance R5. Conversely, when switch 16' is moved to the left to connect the measuring network with resistance 74, switch 18' is moved to its upper position to include all of resistance R5 in the lower branch and switch 17' is moved to its lower position connecting with contact slider 10 of resistance R3. Therefore as the switch 16' is thrown from one position to the other alternately to measure the currents traversely resistances 74, 74', the calibration of the network is changed according to the characteristics of the resistances that the readings may be correct. If resistance 74 or 74' is replaced, it is necessary only to change the setting of its corresponding resistance R3 or R5 according to the constant of the substituted resistance.

It will be understood that alternate operation of switches 16', 17' and 18'' may be effected by apparatus similar to that shown in Fig. 5 and that the network may be used for measurements other than of direct current by use of properly calibrated scales. It is also to be understood that the term "measuring" is used in a generic sense, and is not limited to indicating or recording the magnitude or magnitudes of given effects or conditions, but includes determining such magnitudes for any desired purpose, for example, automatically actuating or controlling other apparatus in accordance with departure from a predetermined magnitude or condition.

What I claim is:

1. An electrical measuring system comprising a calibrated impedance, a response element in circuit therewith responding non-linearly to a condition to be measured, a second adjustable impedance connected in shunt to said first-named impedance and forming therewith a branched potentiometer circuit, and a source of unidirectional current connected to said potentiometer circuit so that the adjustment of said second impedance will vary the current through both branches of the potentiometer, the variation of said second impedance proportionally to the ratio of the magnitudes of the responses of said element and the element utilized in calibration of said first impedance at a particular magnitude of said condition, effecting compensation for the dissimilarity of the response curves thereof throughout the working range of said system and without substantial change of the current from said source.

2. An electrical measuring system comprising a potentiometer including a calibrated slide wire, an element whose potential varies in accordance with the magnitude of a condition in circuit with said slide wire, a battery for supplying current to said potentiometer, and means to vary the current through said slide wire proportionally to ratio between the potentials of said element and of the element utilized in calibration of said slide wire at a particular magnitude of said condition without substantially changing the current drawn from the battery comprising an adjustable impedance included in shunt with said slide wire, and connections from said battery to said potentiometer so that the adjustment of said impedance will vary the current through both branches of the potentiometer.

3. An electrical measuring system comprising a split-potentiometer circuit including a calibrated slide wire in one branch thereof, an element whose potential varies in accordance with the magnitude of a condition in a shunt path including a variable amount of said slide wire, a resistance adjustable to vary the distribution of current between the branches of said circuit, and a scale associated with the adjustable element thereof, the adjustment of said resistance to settings determined by the ratio of the potentials of said element and of the element utilized in calibration of said slide wire effecting a proportional redistribution of current through the branches of said split-potentiometer circuit to compensate for dissimilarity of the response curves of said elements throughout the range of said slide wire.

4. An electrical measuring system comprising a calibrated impedance, an adjustable impedance in shunt thereto, a plurality of elements having dissimilar response curves following substantially the same law of variation, a source for supplying unidirectional current to said impedances and means selectively and successively to include said elements in circuit with said first impedance and simultaneously to effect an adjustment of said second impedance proportional to the ratio of the responses of said elements for a particular magnitude of condition whereby the dissimilarity of said curves is compensated for throughout the working range of said system.

5. An electrical measuring system comprising a self-balancing network including a scale and an indicator therefor, a source of motive-power for the self-balancing mechanism of said network, a plurality of elements having dissimilar response curves following substantially the same law of variation, and means operated by said source of power for successively including said elements in circuit with said network and as each element is included in circuit varying the calibration of said network proportionally to the ratio of the responses at a particular magnitude of condition of said element and the element removed from circuit whereby correct readings may be obtained directly from said scale throughout the range thereof.

6. A pyrometer system comprising a calibrated potentiometer, a plurality of thermo-couples, means individually to include said thermo-couples in circuit with said potentiometer, a source of current for said potentiometer, means for changing the magnitude of current supplied thereby to said potentiometer, and means independent of said current-changing means to vary the calibration of said potentiometer proportionally to the ratio of the potentials of said thermo-couples for a temperature within the working range of said system to compensate for the non-linear dissimilarity of the temperature-voltage curves of said thermo-couples.

7. A pyrometer system comprising a calibrated impedance, an adjustable impedance in shunt thereto, a plurality of thermo-couples, means operable selectively and successively to include said thermo-couples in circuit with said first impedance, and means coupled thereto for simultaneous actuation therewith to vary the effective magnitude of said second impedance proportionally to the ratio of the potentials of said thermo-couples for a temperature within the working range of said system.

8. A pyrometer system comprising a self-balancing calibrated potentiometer, a plurality of thermo-couples, motive means for the self-balancing mechanism of said potentiometer, means actuated by said motive means selectively to include said thermo-couples in circuit with said potentiometer and simultaneously to vary the calibration of said potentiometer proportionally to the ratio of the potentials of said thermo-couples for the same temperature.

9. An electrical measuring system comprising a calibrated network, a plurality of elements having dissimilar response curves substantially following the same law of variation, a plurality of contact arms manually adjustable to determine magnitudes of impedance proportional to the responses of said elements for the same magnitude of the condition measured, means operable selectively to include said elements in circuit with said network, and means selectively to engage the corresponding arms.

10. An electrical measuring system comprising a calibrated network, a plurality of elements marked to indicate their responses at a particular magnitude of condition, a calibrated impedance in said network, a plurality of contact arms associated therewith adapted to be set manually to resistance values proportional to the ratio of said responses, and means selectively to include said elements in circuit with said potentiometer and simultaneously operative to effect connection of a corresponding contact arm.

11. A pyrometer system comprising a split-potentiometer circuit, a plurality of thermo-couples marked to indicate their potentials for the same temperature, a tapped resistance in said circuit, a plurality of dial switches having fixed contacts connected to said tapped resistance and adjustable contacts adapted to be set manually to resistance values proportional to said potentials, and means operable selectively to include said thermo-couples in circuit with said potentiometer and simultaneously to effect connection to a corresponding adjustable contact.

12. A split-circuit potentiometer comprising an upper branch and a lower branch, a slide wire in one of said branches, a response element connected between the slide wire contact and a point in one of said branches, resistances connecting adjacent ends of said branches, and adjustable contact arms cooperating with said resistances connected to a current source.

13. A split-circuit potentiometer comprising an upper branch and a lower branch, the fixed resistances of said branches being equal, a slide wire in one of said branches, a resistance connecting one pair of ends of said branches of one-tenth the magnitude of the fixed resistance of one of said branches, a resistance connecting the other pair of ends of said branches of nine-tenths the magnitude of fixed resistance of one of said branches, and adjustable contact arms cooperating with said resistances connected to a current source.

14. A split-circuit potentiometer comprising an upper branch and a lower branch, the fixed resistance of said branches being equal, a slide wire in one of said branches, a resistance connecting one pair of ends of said branches divided into ten sections of equal value, connections from said sections to a multi-point switch, a second resistance connecting the other pair of ends of said branches divided into nine sections each equal to said first-named resistance, connections from the last-named sections to a second multi-point switch, and connections from the movable contact arms of the said switches to a source of current.

15. An electrical measuring system comprising a potentiometer including a calibrated slide wire and contact element, a circuit including a responsive element connected to said system and at another point to said contact adjustable along said slide wire, a scale associated with said slide wire and contact calibrated in units of measurement, and a second slide wire included in said system having a scale indicating a range of calibration constants of responsive elements within which adjustment of said second slide wires permits direct reading of said first scale.

16. A split-potentiometer circuit comprising an upper branch and a lower branch in shunt thereto, a voltage dividing impedance in one of said branches, a response element connected between one of said branches and a variable section of said impedance, an impedance connecting adjacent ends of said branches, a source of current, and means for connecting said source of current to a variable point between the terminals of said second impedance and a point more adjacent the other ends of said branches.

17. A potentiometer system comprising a first branch having a fixed resistance and a slide-wire in series therewith, a second branch including a fixed resistance in shunt to said branch, a response element connected between said slide wire and a point in one of said branches, a source of current, and means for connecting said source of current across a variable portion of said second fixed resistance to calibrate the system for different characteristics of said response element.

EDGAR D. DOYLE